June 30, 1953
L. R. LUDWIG ET AL
2,644,099
EXPLOSION-RESISTANT MOTOR
Original Filed Aug. 15, 1946
Fig.I.
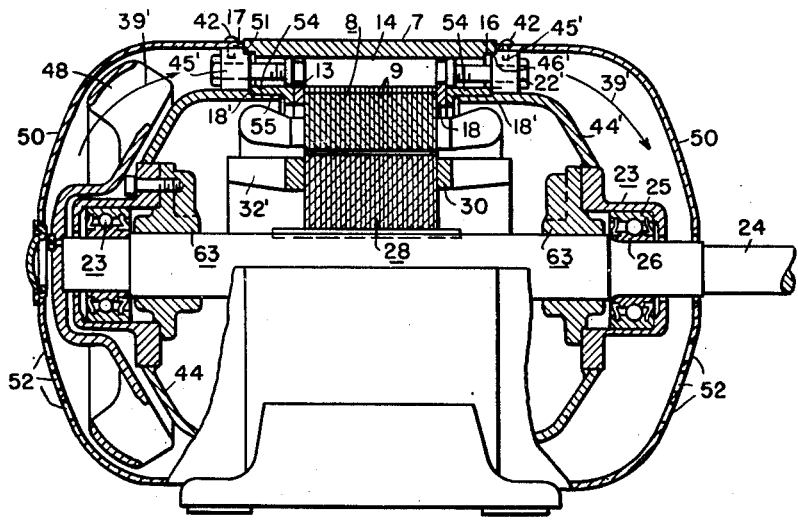
Fig.2.
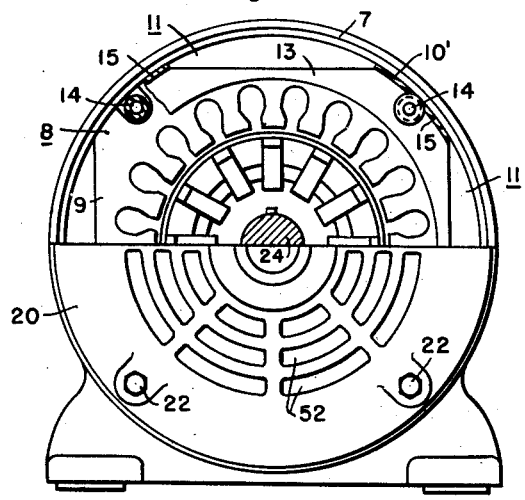
WITNESSES:
E. A. McCloskey.
Nw. C. Groome
INVENTORS
Leon R. Ludwig, Theodore C. Fockler,
William H. Formhals and Howard T. Walton.
BY
O. B. Buchanan
ATTORNEY Patented June 30, 1953

2,644,099

UNITED STATES PATENT OFFICE 2,644,099

EXPLOSION-RESISTANT MOTOR

Leon R. Ludwig, Pittsburgh, Pa., Theodore C. Fockler and William H. Formhals, Buffalo, N. Y., and Howard T. Walton, Pittsburgh, Pa., assignors to Westinghouse Electric Corporation, East Pittsburgh, Pa., a corporation of Pennsylvania Original application August 15, 1946, Serial No. 690,628, now Patent No. 2,571,907, dated October 16, 1951. Divided and this application February 28, 1951, Serial No. 213,092

4 Claims. (Cl. 310—57)

This is a division of our application Serial No. 690,628, filed August 15, 1946, now Patent No. 2,571,907, issued October 16, 1951, on splash-proof motors.

Our present invention relates to electric motors, and more particularly to a redesigned line of induction motors, which have the advantages of extreme simplicity and economy of construction, a pleasing appearance, a small size, within the standardization-limits established by the industry, and complete convertibility into a maximum number of motor-types with a minium number of parts.

A principal object of our invention is to provide a novel explosion-resistant construction, which can be produced from a fan-cooled construction by the simple addition of two ring-members, welded on the ends of the stator-core member and subsequently rabbeted, with brackets to match, and with slight variations in the bearing. In our explosion-resistant motor, two imperforate brackets are used, each having an axial register, and also a long radial register, with the ring-member at that end of the stator-core. Among other advantages, this form of construction makes possible the use of a core-holding end-plate which is only a quarter of an inch thick, or less, or, in general, thin enough so that it can be punched, as distinguished from a cast or machined job.

With the foregoing and other objects in view, our invention consists in the structures, combinations, systems, methods and parts, hereinafter described and claimed, and illustrated in the accompanying drawings, wherein:

Fig. 1 is a longitudinal sectional view of a form of embodiment of our invention, to provide an explosion-resistant motor, the motor-foot being shown in elevation, and Fig. 2 is an end view of the motor shown in Fig. 1, with the top half of the bracket cut away.

All forms of embodiment of our motor utilize a stator-member comprising a strong, rigid, frame-ring 7 and a stator-core assembly 8. In many cases, it is desirable that the frame-ring 7 shall constitute an imperforate enclosure-ring for the machine. The stator-core assembly 8 comprises a rigidly held stack of stator-laminations 9, which have a tight fit, known as an interference-fit, within the inside of the frame-ring 7, at a plurality of circumferentially-spaced points, as indicated at 10' in Fig. 2. It is preferable that the stator-laminations shall fit tightly enough, in the frame-ring 7, so as to readily conduct heat from the laminations to the frame-ring. At other points around their peripheries, the stator-laminations 9 are spaced from the inside of the frame-ring 7 so as to provide axially extending ventilating-spaces 11, which admit of an axial air-flow over the stator-core laminations 9, preferably, though not necessarily, extending from one end of the core straight through to the other end. The stator-core laminations carry the stator or primary windings 10, the end-turns of which are shown in Fig. 1.

The stack of stator-core laminations 9 may be held together in any desired way, so far as the broader aspects of our invention are concerned. We prefer to use the improved core-holding assembly which constitutes the subject-matter of Patent No. 2,447,645, granted August 24, 1948, to Arthur E. Goodwin and Leon R. Ludwig. It is sufficient to say that the stator-laminations 9 are held between two end-plates 13, which are held tightly compressed against the laminations, by means of a plurality of circumferentially-spaced, elongated, axially disposed lamination-holding members, which are shown as locking-bars 14. The end-plates 13 do not make a tight fit with the inside of the frame-ring 7, but are welded to the inside of the frame-ring, after the core-member is assembled in the ring, at a plurality of circumferentially spaced points, as indicated at 15 in Fig. 2. The remaining peripheral portions of the end-plates are spaced from the inside of the frame-ring 7, to provide the aforementioned axial ventilating spaces 11.

After the stator-frame has been assembled, as above described, two fits are machined on each end of the frame, these four machining operations being advantageously performed simultaneously. One of these fits is in the frame-ring 7, both ends of which are rabbeted, to provide an accurate radial-register surface 16, and an accurate axial-register surface 17. The other fit is on the stator end-plates 13, the exposed end-faces of each of which are machined, to provide an accurate axial-register surface 18, as shown in Fig. 1.

Our explosion-resistant machine, as shown in Fig. 1, is designed so as to be able to utilize the same parts which are utilized in other types which enjoy a more extensive sale, so as to obtain the advantage of quantity-production. An essential feature of explosion-resistant designs is the provision of a sufficiently elongated, and sufficiently narrow, flame-escape vent, so that any flame would be cooled to extinguishment, before traversing all of the flame-escape vent. Heretofore, this has necessitated the provision of rather massive frame-parts, coming down over the outer peripheries of the stator-core, at each end of the machine, together with an extensive rabbeting operation, on this frame-part, so as to provide an axially long, radial-register surface, which could be matched with a corresponding surface provided on the imperforate bracket at that end of the machine, so as to provide an explosion-resistant flame-leakage or creepage path.

According to our present invention, as shown in Fig. 1, we have provided an easy means of converting a machine from a fan-cooled design to an explosion-resistant design, necessitating, for this purpose, the modification of the stator-end-plates 13 by the addition of two imperforate, axially-extending ring members 54, one extending axially outwardly from the bore or inner periphery of each end-plate 13. These added ring-members 54 are then rabbeted, so as to provide an accurately machined axial-register surface 18', and an axially elongated, flame-proof, radial-register surface 55. Similar surfaces are machined on two imperforate end brackets 44', one on each end of the machine, so as to provide the necessary fits.

Each imperforate bracket 44' carries bearings 23 for supporting the rotor-shaft 24. In the particular motor which is shown in the drawings, the bearings 23 are ball-bearings, in which the stator part 25 of the bearing is permanently assembled with the rotating bearing-part 26 which is fixed to, or carried by, the shaft 24, so that the shaft-mounted bearing-part 26 has to be pressed on or off the shaft, whenever a bracket 20 is applied to, or removed from, the machine, or, if the ball-bearing part 26 is left attached to the shaft, then the stationary bearing-part 25 has to be moved in or out of the bearing housing 23, when the bracket is applied to, or removed from, the machine. At any rate, the two rotating bearing-parts 26, at the two ends of the machine, are at a fixed distance apart, said distance being fixed by the particular shaft 24 which is utilized. In our explosion-resistant design, as shown in Fig. 1, we use a somewhat elaborate flame-proof or flame-extinguishing bearing-design, as indicated at 63, in a manner which is well known in the art.

The complete motor is provided with a rotor-member which is carried by the motor-shaft 24. The rotor is characterized by a rotor core-member 28, and suitable fan-means for ventilating the machine. In the particular form of motor which is illustrated, a cast squirrel-cage rotor is utilized, having end-rings which are shown at 30, and a plurality of straight, or axially directed, ventilating-vanes 32', projecting axially from each of the end-rings 30.

The outer peripheries of the imperforate brackets 44 make no radial register with the stator-core assembly, but they are provided with a plurality of outwardly extending lugs 45, which are disposed opposite the ends of the locking-bars 14, so that the imperforate brackets may be secured to the respective ends of the stator-member, by means of bolts 22' which pass through the lugs 45 and into the ends of the respective locking-bars 14. In other motor-designs, such as the open types of motors and the fan-cooled motors, the lugs 45 provide convenient means for providing a radial registry with the corresponding radial-register surface 16 of the end of the frame-ring, while at the same time permitting an axial flow of cooling air over the outside of the imperforate brackets 44'.

In our herein-described explosion-resistant machine, the necessary radial-register is provided at 55, by the ring-members 54 which are carried by the respective end-plates 13 of the stator-core, and hence there is no need to provide a radial-register at 16 on the end of the frame-ring, as in other motor-designs. Thus, in our explosion-resistant motor as shown in Fig. 1, the outer surface of the peripheral lugs 45' of the imperforate brackets 44' are cut back, as indicated at 46', so as not to make contact with the end of the frame-ring 7.

The continuous axial-register and radial-register fits, at the surfaces 18 and 55, provide closed-housing joints between the stator-core and the two imperforate brackets 44'. The fact that the brackets 44' are imperforate, or have no ventilating-hole therein, added to the provision of the closed-housing joints at 18 and 55, results in the complete enclosure of the motor, as shown in Fig. 1. The primary end-turns 10 are ventilated by the internally mounted fan-vanes 32' which are inside of the machine. These fan-vanes or blades 32' operate by stirring the air within each of the imperforate brackets 44. They do not produce an axially flowing stream of ventilating-air, because the outer periphery of the stator-core 9 is effectually sealed, at the surfaces 18 and 55, at both ends of the stator-core.

Our explosion-resistant motor, as herein illustrated, is like our fan-cooled motor, as shown in our copending application Serial No. 213,091, filed February 28, 1951, now Patent No. 2,615,937 dated October 28, 1952, in being provided with an externally mounted fan-means, in the form of one or more axial-flow fans 48, only one being shown, which is removably mounted on the shaft 24 on the outside of at least one of the bearings 23, for causing air to flow from one end of the machine to the other, this axial air-flow being directed by means of two identical hoods 50, one at each end of the machine. Each hood 50 has a peripheral part having an accurately machined, axial-register surface 51, which registers or fits against the corresponding surface 17 at that end of the frame-ring 7, so as to make a substantially continuous fit on that end of the frame-ring. The hoods 50 may be retained in place by any suitable means, such as the set-screws 42. The two hoods 50 are provided with air-vent openings 52 which are preferably disposed somewhere near the bearings 23, so as to constrain the external ventilating-air to pass over the bearings, as shown by the arrows 39'. The air-vents 52 are also preferably on the bottom halves of the hoods 50, for protection against the entry of water and dirt.

In Fig. 1, the addition of the ring-members 54, which are welded or otherwise secured to the inner peripheries of the end-plates 13, avoids the previous necessity for massive cast frame parts which have heretofore been necessary in designs which are utilizable in flame-resistant constructions. The addition of these rings 54 also emphasizes the importance of utilizing core-holding end-plates 13 which are cut or punched out of flat disks or plates, resulting in a construction which can be easily fabricated, at low cost, while requiring a minimum of space and weight.

While we have shown our invention in forms of embodiment which are at present preferred, we desire it to be understood that our invention is susceptible of a wide variety of application and adaptation. We desire, therefore, that our claims shall be accorded the broadest construction consistent with their language.

We claim as our invention:

1. An explosion-resistant dynamo-electric machine comprising a strong, rigid frame-ring, a stator-core comprising a stack of stator-laminations, means for rigidly holding said laminations together in a stock, said stator-core fitting, at a plurality of spaced points about the outer periphery of the stator-laminations, within the inside of the frame-ring, the stator-laminations being spaced from the inside of the frame-ring at other peripheral points, the stator core having an imperforate, axially extending ring-member at each end thereof, each of said ring-members having an accurate, axially elongated, radial-register surface, a stator-winding carried by the stator-core, two imperforate brackets removably mounted on the frame-ring, one at each end, each imperforate bracket having no ventilating-hole therein and having an accurate, axially elongated radial-register surface co-operating with the corresponding portions of the ring-members of the stator-core, said brackets having circumferentially spaced radial projections, means for securing said projections to the stator-core holding means, bearings carried by said imperforate brackets, a rotor-member having a shaft which is supported by said bearings and having internally mounted fan-means for at least ventilating the end-turns of the stator-winding at both ends of the stator-core, said rotor-member further having externally mounted fan-means, removably mounted on the shaft on the outside of at least one of the bearings, for causing a ventilating gas to flow axially within the space between the inside of the frame-ring and the periphery of the stator-laminations, and two hoods, each having a ventilating-hole and having a peripheral part which makes a substantially continuous fit at its end of the frame-ring.

2. An explosion-resistant dynamo-electric machine comprising a strong, rigid frame-ring, a stator-core comprising a stack of stator-laminations, means for rigidly holding said laminations together in a stack, said stator-core fitting, at a plurality of spaced points about the outer periphery of the stator-laminations, within the inside of the frame-ring, the stator-laminations being spaced from the inside of the frame-ring at other peripheral points, the stator core having an imperforate, axially extending ring-member at each end thereof, each of said ring-members having an accurate, axially elongated, radial-register surface and an accurate axial-register surface, a stator-winding carried by the stator-core, two imperforate brackets removably mounted on the frame-ring, one at each end, each imperforate bracket having no ventilating-hole therein and having an accurate, axially elongated radial-register surface and an accurate axial-register surface co-operating with the corresponding portions of the ring-members of the stator-core, said brackets having circumferentially spaced radial projections, means for securing said projections to the stator-core holding means, bearings carried by said imperforate brackets, a rotor-member having a shaft which is supported by said bearings and having internally mounted fan-means for at least ventilating the end-turns of the stator-winding at both ends of the stator-core, said rotor-member further having externally mounted fan-means, removably mounted on the shaft on the outside of at least one of the bearings, for causing a ventilating gas to flow axially within the space between the inside of the frame-ring and the periphery of the stator-laminations, and two hoods, each having a ventilating-hole and having a peripheral part which makes a substantially continuous fit at its end of the frame-ring.

3. An explosion-resistant dynamo-electric machine comprising a strong, rigid frame-ring, a stator-core comprising a stack of stator-laminations, means for rigidly holding said laminations together in a stack, said stator-core fitting, at a plurality of spaced points about the outer periphery of the stator-laminations, within the inside of the frame-ring, the stator-laminations being spaced from the inside of the frame-ring at other peripheral points, the stator core having an imperforate, axially extending ring-member at each end thereof, each of said ring-members having an accurate, axially elongated, radial-register surface, a stator-winding carried by the stator-core, two imperforate brackets removably mounted on the frame-ring, one at each end, each imperforate bracket having no ventilating-hole therein and having an accurate, axially elongated radial-register surface co-operating with the corresponding portions of the ring-members of the stator-core, said brackets having circumferentially spaced radial projections, means for securing said projections to the stator-core holding means, bearings carried by said imperforate brackets, and a rotor-member having a shaft which is supported by said bearings and having internally mounted fan-means for at least ventilating the end-turns of the stator-winding at both ends of the stator-core.

4. An explosion-resistant dynamo-electric machine comprising a strong, rigid frame-ring, a stator-core comprising a stack of stator-laminations, means for rigidly holding said laminations together in a stack, said stator-core fitting, at a plurality of spaced points about the outer periphery of the stator-laminations, within the inside of the frame-ring, the stator-laminations being spaced from the inside of the frame-ring at other peripheral points, the stator core having an imperforate, axially extending ring-member at each end thereof, each of said ring-members having an accurate, axially elongated, radial-register surface and an accurate axial-register surface, a stator-winding carried by the stator-core, two imperforate brackets removably mounted on the frame-ring, one at each end, each imperforate bracket having no ventilating-hole therein and having an accurate, axially elongated radial-register surface and an accurate axial-register surface co-operating with the corresponding portions of the ring-members of the stator-core, said brackets having circumferentially spaced radial projections, means for securing said projections to the stator-core holding means, bearings carried by said imperforate brackets, and a rotor-member having a shaft which is supported by said bearings and having internally mounted fan-means for at least ventilating the end-turns of the stator-winding at both ends of the stator core.

LEON R. LUDWIG.
THEODORE C. FOCKLER.
WILLIAM H. FORMHALS.
HOWARD T. WALTON.

References Cited in the file of this patent

UNITED STATES PATENTS

| Number | Name | Date |
| --- | --- | --- |
| 1,759,415 | Perlesz | May 20, 1930 |
| 1,799,071 | Smith | Mar. 31, 1931 |
| 1,876,767 | Selden | Sept. 13, 1932 |

FOREIGN PATENTS

| Number | Country | Date |
| --- | --- | --- |
| 727,615 | France | Mar. 29, 1932 |